Patented Apr. 23, 1929.

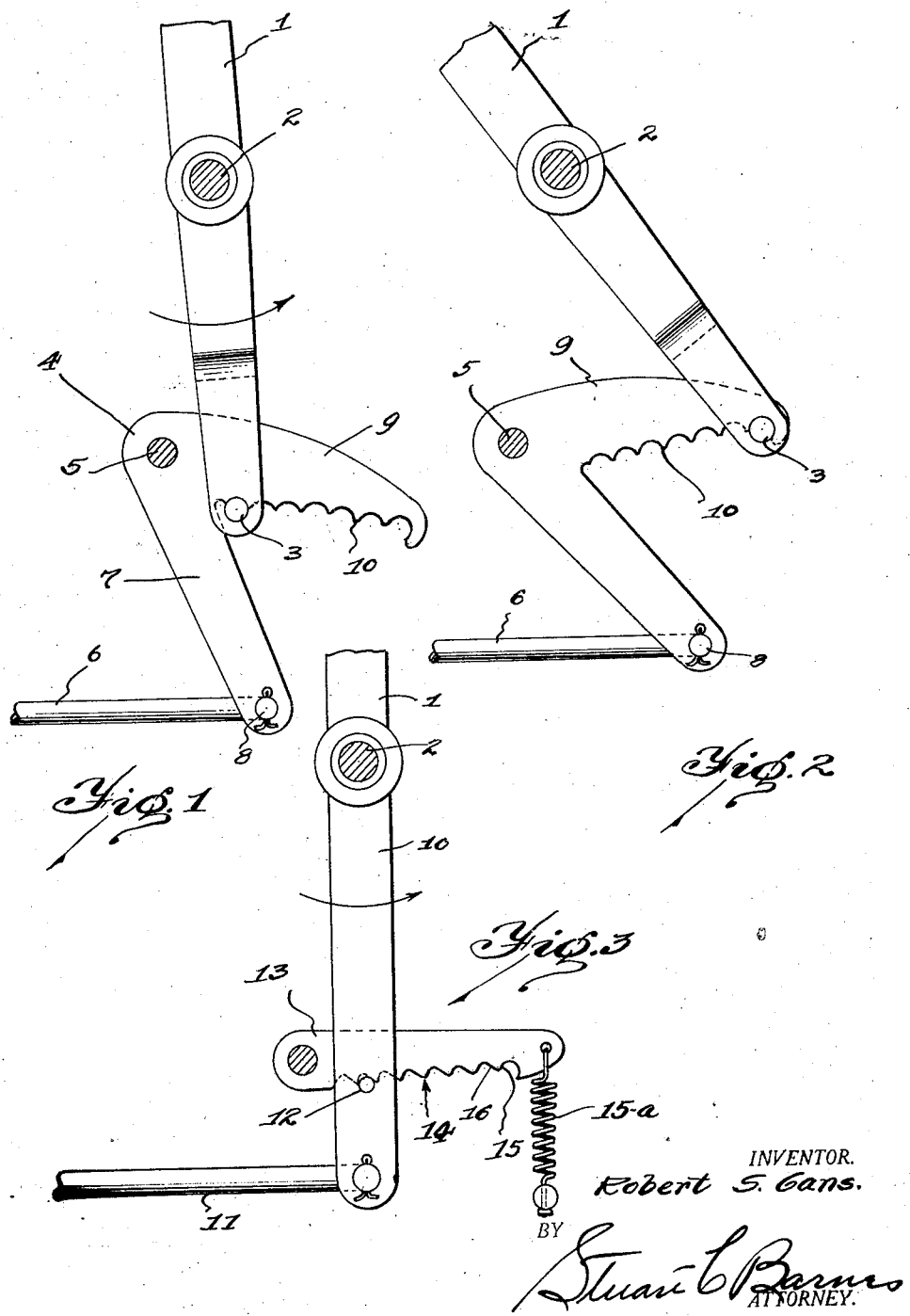

1,710,305

UNITED STATES PATENT OFFICE.

ROBERT S. GANS, OF DETROIT, MICHIGAN.

CONTROL LEVER.

Application filed June 7, 1926. Serial No. 114,138.

This invention relates to control levers and has to do more particularly with a lever for the control of the brakes on an automobile or similar vehicle.

It has been the custom to provide control levers of this type with a pawl which operates in the teeth of a ratchet. The pawl engages with the ratchet teeth and holds the lever in position when the brakes are applied. In order to actuate the lever to release the brakes, it is necessary to disengage this pawl from the ratchet teeth, and for this purpose there is usually a rod-like member, connected to the pawl, extending along the control lever to the handle thereof. A gripping device, or a button adapted to be depressed is provided by which the rod may be actuated to release the pawl. Thus, there are two distinct operations which must be made in order to release the brakes, namely, the manual operation of releasing the pawl from the ratchet, and that of manipulating the control itself to release the brakes.

According to the present invention the brakes of the vehicle may be applied or released by the single operation of moving the control lever. This control lever is mounted on the vehicle, and one end thereof is adapted to be actuated by the operator, to apply or release the brakes in accordance with the movements of the lever. A draft-rod, or brake-rod, is associated with the lever in such a way that the brakes are securely held in "on" position, but at the same time the lever is movable to release the brakes without involving the other operations such as releasing a pawl from a ratchet.

A satisfactory form which the control lever may take is shown in the accompanying drawings, wherein Fig. 1 is a side elevation with the brakes in "off" position; Fig. 2 is a similar view showing the "on" position; and Fig. 3 is a view of a modified form.

As shown in the drawing, a lever 1 is provided which is fulcrumed, as at 2, to a stationary part of the vehicle. The lower end of the lever operates to apply and release the brakes of the vehicle upon manipulation of the upper end. For this purpose the lower end of the lever may be bifurcated and provided with a pin 3 extending across the bifurcated parts.

A member 4 which is generally in the form of a bell-crank, is pivoted as at 5, and a draft-rod 6 is secured to the arm 7 of the bell-crank member, as at 8. The arm 9 of the bell-crank member is provided with a series of ridges and furrows 10 which, for the purpose of convenience, may be termed corrugations. The arm 9 of the bell-crank member lies between the bifurcated parts of the control lever 1, and the pin 3 engages in the corrugations 10. The furrows are of such a shape and size as to substantially fit the pin 3, and the ridges may be slightly rounded as shown.

The draft rod 6 extends to the brake or brakes of the vehicle (not shown). In order to apply the brakes, the operator pulls the handle on the upper end of the control lever and moves the parts from the position shown in Fig. 1 to that shown in Fig. 2. In this movement the pin 3 moves in an arc around the fulcrum 2 and as it engages with the underneath side of the arm 9 of the bell-crank member, the bell-crank member is moved around on its pivot 5. This motion is applied to the brakes through the draft rod 6 and arm 7 of the bell crank member.

When the brakes are on, the pull of the draft rod tends to rotate the bell crank around its pivot in a clockwise direction as shown in Fig. 2. This is prevented by reason of the fact that the pin 3 engages in one of the furrows of the corrugated portion of the arm 9. It will be observed that the pull of the arm 9 on the pin 3 is in a downward direction, whereas the counterforce exerted by the lever 1 is upward, and thus the brakes are positively prevented from being released. However, the lever 1 may be moved by an operator back to the position shown in Fig. 1, and the pin 3 rides over the corrugated part of the bell crank member.

By this construction the brakes may be applied and released by a simple reciprocatory movement of the handle of the control lever. There are no extra operations required of the operator such as the releasing of a pawl from a ratchet, and in applying or releasing the brakes the pin 3 rides along the corrugated portions of the bell crank member, but at the same time, when the brakes are applied, release thereof is prevented by reason of the pin 3 being engaged in one of the furrows of the corrugated portion of the bell-crank member.

In the modified form shown in Fig. 3, a control lever 10 is connected to a draft-rod 11, and is provided with a pin 12. A pivoted member 13 is provided with a roughened or corrugated portion 14, and a spring member 15ª acts upon the member 13 and holds the corrugated surface of the member in contact with the pin 12 on the control rod. In this form of the invention the side 15 of each ridge is preferably more abrupt than the side 16 thereof. This is for the purpose of reducing the force required on the part of the operator in applying the brake and for obtaining a more secure holding action by the member 13 on the pin 12 to hold the brakes in "on" position.

In the use of this modified form the operator pulls the control lever, and the pin 12 is moved in an arc. The pin travels along the corrugations 14 and the member 13 is turned about on its pivot against the tension of the spring 15ª. When the brakes are applied the operator releases the lever and the brakes are held in "on" position by reason of the pin 12 engaging in one of the furrows of the corrugated portion. As stated above, the sides 16 of each corrugation are shaped so as to permit the pin to be moved thereover with a minimum effort on the part of the operator in applying the brakes. The sides 15 are more abrupt for the purpose of locking the lever with the brakes in "on" position. The abruptness of this side of each corrugation will, of course, be carefully calculated in connection with the tension of the spring, and the pull exerted by the draft-rod. The calculation will be such, however, that the brakes can be released by the action of an operator pushing forward on the upper end of the control lever.

This form of the invention is similar to the form shown in Figs. 1 and 2, in that the brakes are applied and released by the single reciprocatory movement of the handle of the lever, and at the same time the lever will be held in locked position in any one of the furrows whereby any desired breaking action is obtained.

An advantage of the form of the device shown in Figs. 1 and 2 is the fact that the principle of the inclined plane is utilized in such a way as to reduce the effort required of an operator in applying the brakes. It will be observed, from a comparison of Figs. 1 and 2, that the movement of the pin 3 from "off" position to "on" position is considerably greater than the movement of the pin 8 and the draft rod. This holds true whether the brakes are thrown completely on or off, or merely thrown part way on or off and increases to a large degree the mechanical advantage of the device.

What I claim is:

1. A control mechanism for brakes or the like, comprising a control lever, engaging means on the lever adapted to travel in an arc upon movement of the lever, a pivoted member having an arm which lies in the path of and contacts with the engaging member which upon movement of the lever is actuated around its pivot by the engaging member sliding along the arm, the pivot point of this member lying within the said arc, brake means operably connected with the pivoted member, said pivoted member being adapted to change the direction of pull exerted by the brake tension so that such pull is exerted substantially directly against a fulcrum point of the lever without substantial tendency to move the lever around its pivot, the said arm of the pivoted member having a roughened or corrugated portion which cooperates with the engaging means on the lever so as to hold the parts in any given position along the length of said corrugated portion.

2. A control device for automobile brakes or similar devices, comprising a vertical lever of the first order, a pivoted bell-crank member the arms of which meet in an acute angle, the upper leg of the bell-crank being substantially horizontal, and provided with corrugations on its lower surface, and the other leg being pivotally connected to a draft rod at a point closely adjacent and below the said corrugated surface, and means on the lever for slidably engaging said corrugated portion whereby the lever will remain locked in any given position in the length of said corrugated portion.

3. A control device, comprising a draft rod, a control lever fulcrumed at a point above the end of the draft rod, a pivoted member positioned between the lever fulcrum and the working end of the draft rod and connected to the draft rod, said member having a corrugated surface, and means on the lever for slidably engaging said corrugated surface, said member being pivoted at a point at or above the line of engagement between the said lever and the said corrugated surface.

4. A control device for automobile brakes or similar devices, comprising a lever, brake actuating means, a pivoted member positioned between the fulcrum lever and the said brake actuating means, said member having a corrugated surface, and means on the lever for slidably engaging said corrugated surface to rock said member on its pivot and actuate the brake means, said member being pivoted at a point which lies near the arc described by the said engaging means on the lever as it slides along the said corrugated surface, whereby the lever will remain locked in any given position in the length of said corrugated portion.

5. A control device for automobile brakes or similar devices, comprising a lever, brake actuating means, a pivoted member provided with a corrugated surface, said pivoted member being operably connected to the brake actuating means, means on the lever for slidably engaging said corrugated surface to rock said member on its pivot to actuate the brakes, whereby said lever will remain locked in any given position in the length of said corrugated portion, the said member being pivoted at a point which is in juxtaposition to the starting point of the said engaging means on the lever as the lever is moved to apply the brakes.

6. A control device for automobile brakes or similar devices, comprising a lever, brake actuating means, a pivoted member provided with a corrugated surface, said pivoted member being operably connected to the brake actuating means, means on the lever for slidably engaging said corrugated surface to rock said member on its pivot to actuate the brakes, whereby said lever will remain locked in any given position in the length of said corrugated portion, said member being pivoted at a point which is in juxtaposition to the starting point of the said engaging means on the lever as the lever is moved to apply the brakes, the said means on the lever moving away from the pivoted point of the member as the lever is moved to apply the brakes.

7. A control device for automobile brakes or similar devices, comprising a lever having a fixed fulcrum point, brake actuating means, a pivoted member operably connected with the brake actuating means, said pivoted member being provided with a corrugated surface, and means on the lever for slidably engaging said corrugated surface to rock said member around its pivot point and actuate the brakes, whereby the said lever will remain locked in any given position in the length of said corrugated portion, the pivot point of said member being positioned adjacent the starting point of the engaging means on the lever when the lever is moved to apply the brakes, and near the arc described by the said engaging means as the lever is moved.

In testimony whereof I affix my signature.

ROBERT S. GANS.